United States Patent
Locatelli

(10) Patent No.: US 11,639,760 B2
(45) Date of Patent: May 2, 2023

(54) CABLE ROUTING FASTENER WITH TORSION ELEMENT

(71) Applicant: A. Raymond et Cie, Grenoble (FR)

(72) Inventor: Julien Locatelli, Rochester Hills, MI (US)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 17/408,677

(22) Filed: Aug. 23, 2021

(65) Prior Publication Data

US 2023/0056146 A1   Feb. 23, 2023

(51) Int. Cl.
*F16L 3/137* (2006.01)
*F16L 3/233* (2006.01)
*H02G 3/32* (2006.01)
*F16B 21/08* (2006.01)

(52) U.S. Cl.
CPC ............ *F16L 3/137* (2013.01); *F16B 21/086* (2013.01); *F16L 3/233* (2013.01); *H02G 3/32* (2013.01)

(58) Field of Classification Search
CPC ......... F16L 3/137; F16L 3/233; F16B 21/086; H02G 3/32
USPC ........................................................ 248/71
See application file for complete search history.

(56) References Cited

U.S. PATENT DOCUMENTS

| | | | | |
|---|---|---|---|---|
| 345,477 A * | 7/1886 | Berger | ....................... | F16L 3/04 248/71 |
| 349,158 A * | 9/1886 | Hall | ........................... | F16L 3/04 248/71 |
| 381,664 A * | 4/1888 | Abrahams | ................. | F16L 3/04 248/71 |
| 402,003 A * | 4/1889 | Davis | ........................ | F16L 3/04 248/71 |
| 518,943 A * | 5/1894 | Eller | ......................... | F16L 3/04 248/71 |
| 525,088 A * | 8/1894 | Belding | ................ | F16L 3/1033 248/71 |
| 3,839,777 A * | 10/1974 | Puzio | ............... | H01B 13/01209 29/760 |
| 6,206,331 B1 | 3/2001 | Keith et al. | | |

(Continued)

FOREIGN PATENT DOCUMENTS

| | | | | |
|---|---|---|---|---|
| CA | | 701377 A | 1/1965 | |
| DE | 102016120748 A1 * | | 5/2018 | ............ B60K 35/00 |

(Continued)

*Primary Examiner* — Kimberly T Wood

(74) *Attorney, Agent, or Firm* — Warner Norcross + Judd LLP

(57) ABSTRACT

An improved cable routing fastener is provided. The cable routing fastener includes a base portion having an integral torsion element and includes a clip, for example a fir-tree clip, integrally joined to the torsion element. The torsion element includes first and second torsion bars on opposing sides of the rotatable clip, such that clip is rotatable relative to the base portion from a first position to a second position in response to an applied torque. The clip extends laterally outward from the base portion in the first position and extends downward from the base portion in the second position. The base portion and the clip are co-molded in the first position as a unitary article, with the clip being manually rotatable into the second position for attachment to an object, for example a vehicle panel or a vehicle pillar.

19 Claims, 6 Drawing Sheets

(56) References Cited

U.S. PATENT DOCUMENTS

| | | | |
|---|---|---|---|
| 7,041,903 B2 * | 5/2006 | Odahara | F16C 1/105 |
| | | | 174/64 |
| 8,672,601 B2 | 3/2014 | Nitsche | |
| 2001/0028823 A1 | 10/2001 | Takeda | |
| 2005/0253026 A1 | 11/2005 | Ogawa | |
| 2007/0018057 A1 | 1/2007 | Kovac | |
| 2007/0102594 A1 | 5/2007 | Geiger et al. | |
| 2009/0191025 A1 | 7/2009 | Jackson, Jr. | |
| 2014/0183309 A1 * | 7/2014 | Pasho | A47G 23/0225 |
| | | | 248/315 |
| 2015/0034777 A1 * | 2/2015 | Ionis | B44D 3/123 |
| | | | 248/113 |
| 2016/0245428 A1 * | 8/2016 | Gustin | F16B 21/04 |
| 2021/0024264 A1 | 1/2021 | Beyer et al. | |

FOREIGN PATENT DOCUMENTS

| | | | | |
|---|---|---|---|---|
| EP | 0886093 B1 | 12/1998 | | |
| EP | 2360801 A2 | 8/2011 | | |
| KR | 100752605 B1 | 8/2007 | | |
| KR | 2020022107 A | 3/2020 | | |
| KR | 102447328 B1 * | 9/2022 | | |
| WO | WO-2014006894 A1 * | 1/2014 | | F16B 19/1081 |
| WO | 2019122543 A1 | 6/2019 | | |

\* cited by examiner

CABLE ROUTING FASTENER WITH TORSION ELEMENT

FIELD OF THE INVENTION

The present invention relates to fasteners, and in particular, cable routing fasteners having an integrated torsion element for rotation of a clip into an installation position for attachment to a body panel after molding of the cable routing fastener.

BACKGROUND OF THE INVENTION

Cable routing fasteners are often used in the automotive industry to secure a wire harness to a vehicle frame. Known cable routing fasteners include fir-tree or push-pin clips that are inserted into pre-existing openings in the vehicle frame. Cable routing fasteners also include a wire harness attachment, for example cable ties that are integrally formed with the cable routing fastener, or cable tie slots for receiving cable ties that are separate from the cable routing fastener. The cable ties extend around the wire harness and enter a ratchet-style lock to secure the wire harness in position as the wire harness is routed through the vehicle.

Cable routing fasteners sometimes require intricate geometries in order to meet stringent engineering requirements. For example, cable routing fasteners can be required to secure a wiring harness to sheet metal having a thickness ranging from 0.8 mm to 4.0 mm with a push-in force of less than 45 N while resisting removal at pull-out forces up to 110 N. The above-noted fir-tree clips are well suited for this environment, but can be too close to other features for conventional tooling. Accordingly, there remains a continued need for an improved cable routing fastener for securing a wiring harness to a vehicle frame. In particular, there remains a continued need for a robust cable routing fastener that can be more easily tooled and assembled to a vehicle frame while overcoming these and other challenges.

SUMMARY OF THE INVENTION

An improved cable routing fastener is provided. The cable routing fastener includes a base portion having an integral torsion element and includes a rotatable clip, for example a fir-tree clip, integrally joined to the torsion element. The torsion element includes first and second torsion bars on opposing sides of the clip, such that the clip is rotatable relative to the base portion in response to an applied torque. The clip extends laterally outward from the base portion in a first position and extends downward from the base portion in a second position. The base portion and the clip are co-molded in the first position, with the clip being manually rotatable into the second position prior to attachment to a vehicle panel or a vehicle pillar.

In one embodiment, the cable routing fastener includes features to prevent over-rotation, twisting, and counter-rotation of the rotatable clip. To prevent over-rotation and twisting, the base portion engages a head portion of the clip. To prevent counter-rotation, the base portion includes first and second locking clips that engage first and second locking tabs on opposing sides of the head portion of the clip. The first and second locking clips extend into a lateral recess in the base portion, with the torsion element also extending across the lateral recess. Collectively, the base portion and the locking clips ensure that the torsion element does not experience significant bending loads when the rotatable clip is deployed vertically.

In another embodiment, the clip includes a free end and a fixed end. The fixed end is integrally joined to the first torsion bar and the second torsion bar. The free end moves through an angle of approximately 90° and includes a plurality of resilient fins extending at an acute angle relative to a lengthwise axis of the clip. The base portion includes a central aperture that is adapted to receive a bolt or a screw. In addition, the base portion includes cable tie slots and a concave support surface on which a wiring harness is supportable. The cable routing fastener is optionally molded from a thermoplastic resin, for example nylon resin.

The cable routing fastener of the present invention can provide a number of advantages over existing designs. By molding the rotatable clip in a horizontal position, generally co-planar with the body portion, the tool complexity and cost for the cable routing fastener is greatly reduced. Once manufactured, the rotatable clip can be manually rotated to the vertical position, extending downward for insertion into a fastener aperture. While the rotatable clip is in the vertical position, the torsion element remains under torsion, but in static equilibrium, with the locking clips preventing counter-rotation. In addition, the base portion prevents twisting and over-rotation of the rotatable clip, thereby ensuring the torsion element does not experience significant stresses when the clip is rotated from its molded position.

These and other features and advantages of the present invention will become apparent from the following description of the invention, when viewed in accordance with the accompanying drawings and appended claims.

DETAILED DESCRIPTION OF THE CURRENT EMBODIMENT

Referring to FIGS. 1-6, a cable routing fastener in accordance with one embodiment is illustrated and generally designated 10. The cable routing fastener 10 includes a base portion 12 and a rotatable clip 14, for example a fir-tree clip. The rotatable clip 14 extends laterally outward from the base portion 12 in a first (molded) position and extends downward from the base portion 12 in a second (use) position. The clip 14 is manually rotatable into the second position for attachment to a vehicle structure. Each such feature is discussed below.

Figure 1:
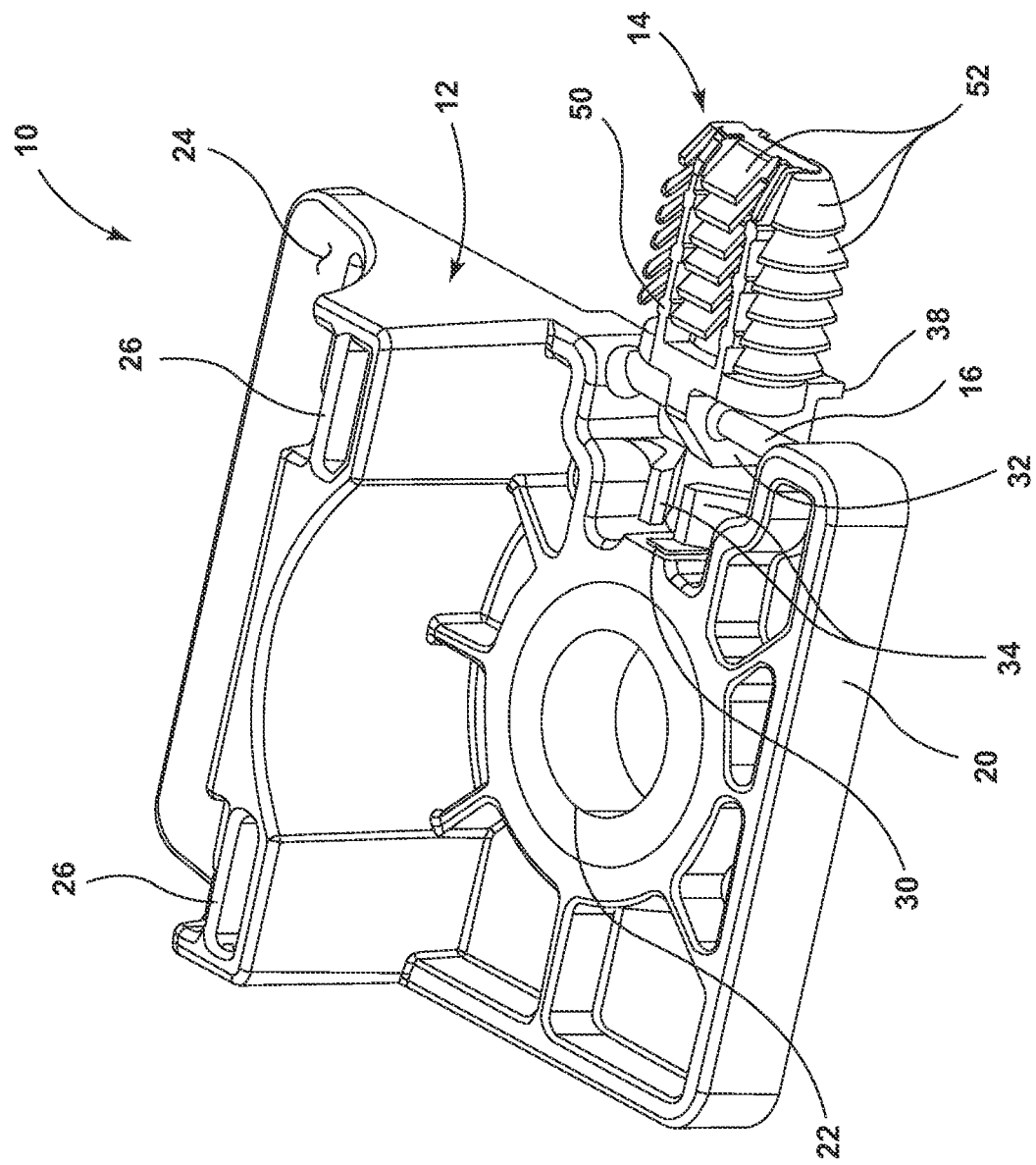
FIG. 1 is a perspective view of a cable routing fastener including a fir-tree clip extending in the horizontal position.
Figure 2:
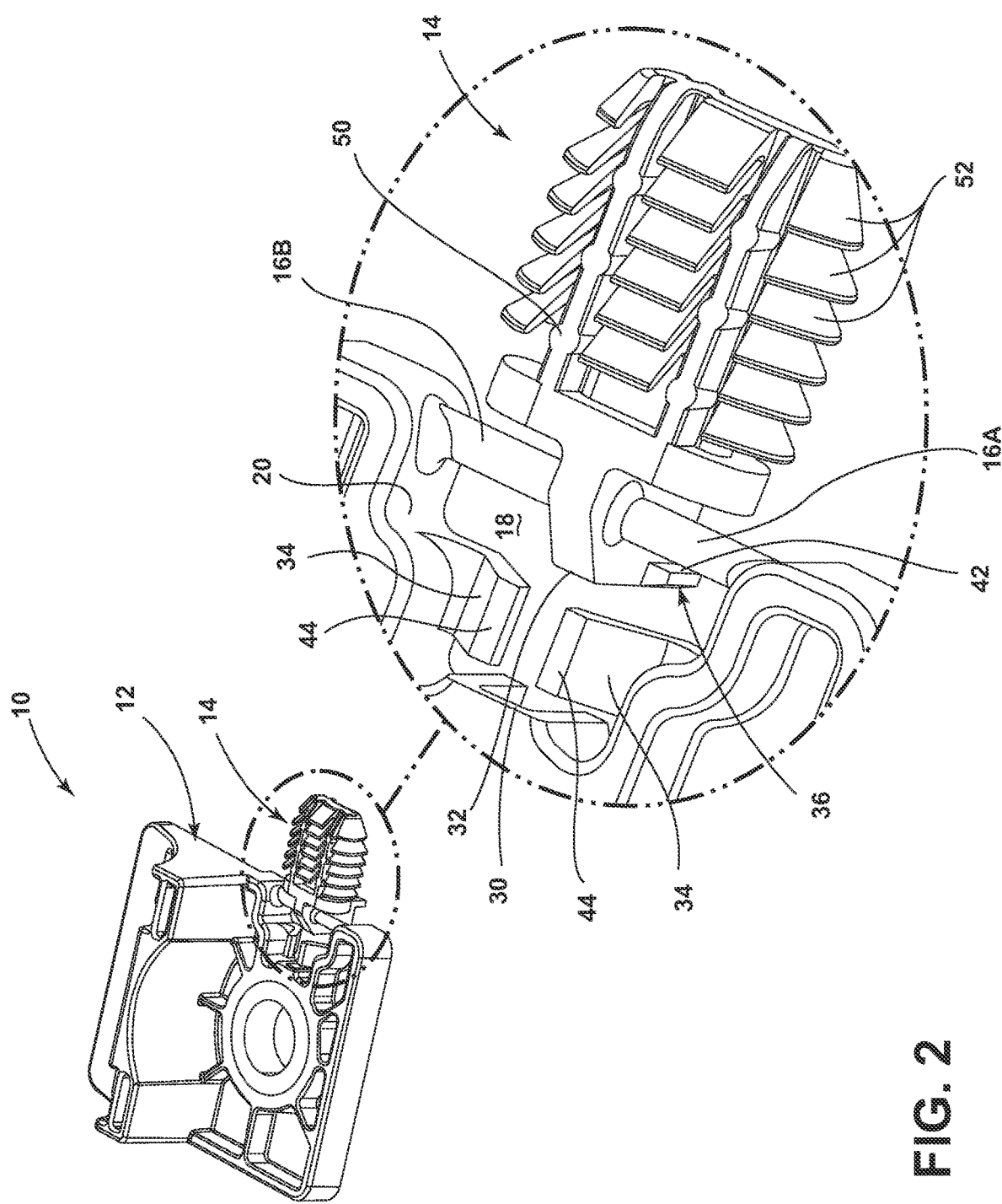
FIG. 2 is a close-up perspective view of the cable routing fastener of FIG. 1, illustrating the fir-tree clip in the horizontal position.

As more specifically shown in FIGS. 1 and 2, the base portion 12 includes an integral torsion element 16. The torsion element 16 is joined at opposing ends to spaced apart portions of the base portion 12. In particular, the torsion element 16 extends across a gap 18 in the outer sidewall 20 of the base portion 12. The torsion element 16 comprises a first torsion bar 16A on a first side of the rotatable clip 14 and a second torsion bar 16B on a second side of the rotatable clip 14. The base portion 12, the rotatable clip 14, and the torsion element 16 are integrally joined to each other, being co-molded from a thermoplastic resin, optionally a nylon resin. The base element 12 also includes a central fastener aperture 22, a concave support surface 24, and cable tie slots 26. The concave support surface 24 is shaped to supportably receive a wiring harness, and the cable tie slots 26 are adapted to receive a plurality of cable ties for securing a wiring harness to the concave support surface 24. In other embodiments the cable ties (not shown) are integrally formed with the base element 12.

As best shown in FIG. 2, the base portion 12 includes features to prevent over-rotation, twisting, and counter-rotation of the rotatable clip 14. For example, the base portion 12 includes a travel stop comprising an inverted U-shaped pocket 30. The inverted U-shaped pocket 30 receives the head portion 32 of the rotatable clip 14 as the rotatable clip 14 rotates past vertical. In particular, the head portion 32 include a lip 38 (shown in FIG. 4) to prevent rotation of the rotatable clip 14 beyond a defined limit, for example 10° past vertical, further optionally 5° past vertical. The sidewalls of the inverted U-shaped pocket 30 prevent twisting of the rotatable clip 14 when in the vertical position as discussed more fully below.

The base portion 12 also includes features to prevent counter-rotation of the rotatable clip 14. For example, the base portion 12 includes first and second resilient locking clips 34. The resilient locking clips 34 are opposite of each other and extend into the gap 18, being angled upwardly, optionally by an angle of 45° above horizontal. The locking clips 34 are engaged by first and second locking tabs 36. The locking tabs 36 protrude from opposing sides of the head portion 32. Each locking tab 36 include a ramped engagement surface 40 for deflecting a locking clip 34 upwardly, such that the rotatable clip 14 can assume the vertical position. Once the locking tabs 36 move past the resilient locking clips 34, the locking tabs 36 prevent counter-rotation of the rotatable clip 14. In particular, the underside of each locking tab 36 includes a flat latching surface 42 that engages an upward-facing surface 44 of a resilient locking clip 34, such that counter-rotation is physically obstructed.

As shown in FIGS. 1-4, the rotatable clip 14 includes a shank 50 having a plurality of resilient fins 52. The resilient fins 52 extend at an acute angle relative to a lengthwise axis of the rotatable clip 14. The shank 50 comprises a first free end of the rotatable clip 14, and the head portion 32 comprises a second free end of the rotatable clip 14. The shank 50 is shaped to be received within a body panel opening, but can be shaped differently in other embodiments. For example, the shank 50 can comprise an expandable one-piece or two-piece fastener. Still other configurations for the shank 50 can be used in other embodiments as desired.

Figure 3:
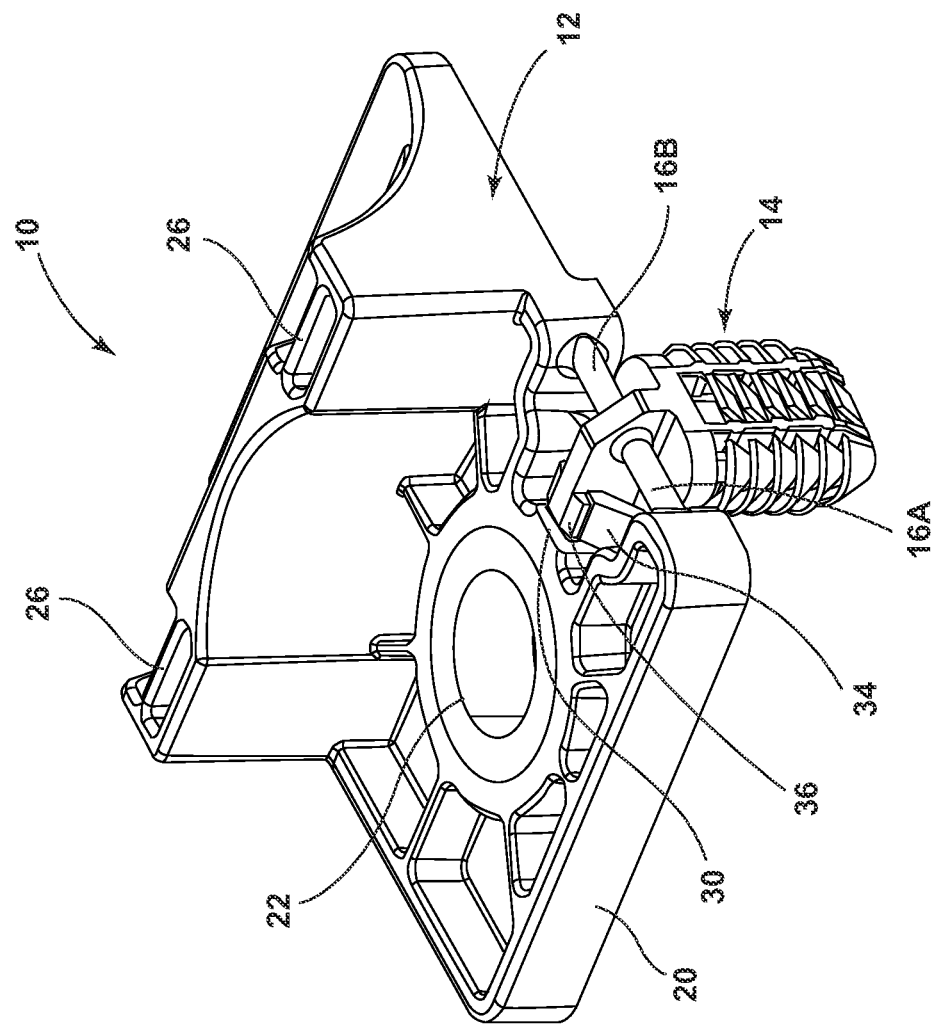
FIG. 3 is a perspective view of a cable routing fastener including a fir-tree clip extending in the vertical position.
Figure 4:
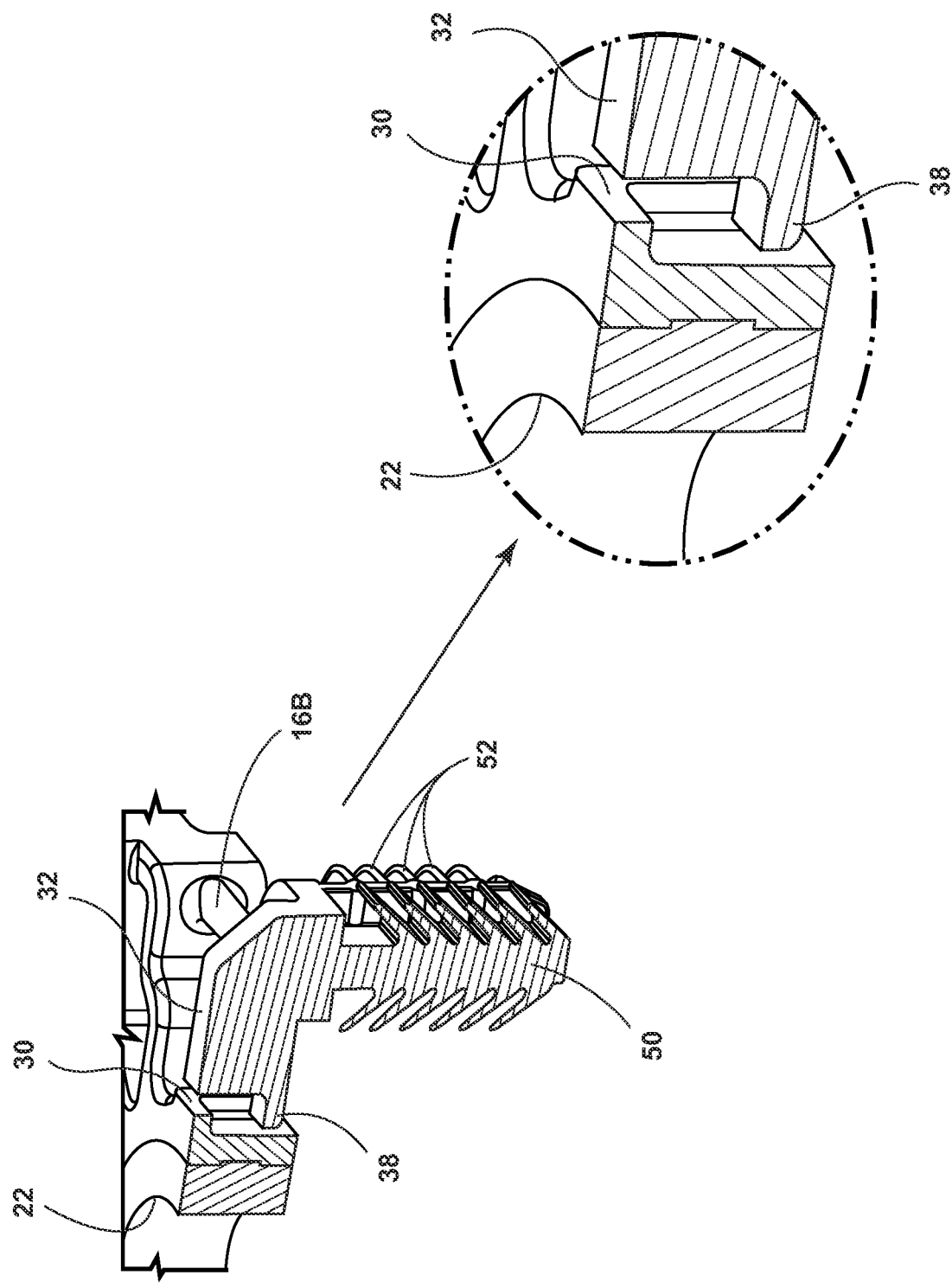
FIG. 4 is a cross-sectional view of the cable routing fastener and fir-tree clip of FIG. 3 in a vertical position.
Figure 5:
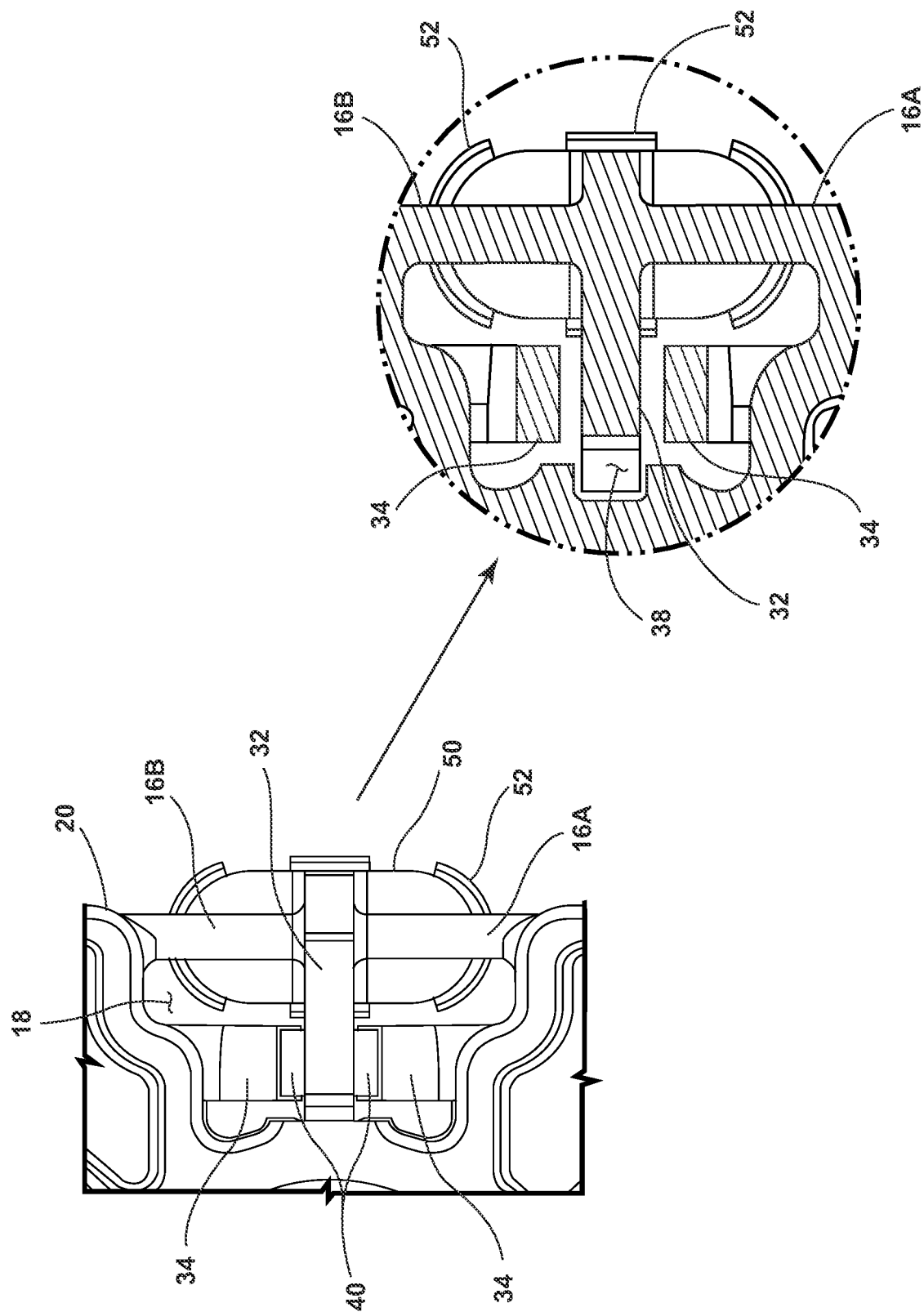
FIG. 5 is a top view of the cable routing fastener and fir-tree clip of FIG. 3 in the vertical position.

As noted above, the cable routing fastener 10 is molded with the rotatable clip 14 in the first position, extending laterally outward from the base portion 12 as shown in FIGS. 1-2. The rotatable clip 14 is manually rotatable into the second position, extending downward from the base portion 12 as shown in FIGS. 3-4. While in the second position, the torsion element 16 remains under torsion, but in static equilibrium. Stated differently, the torsion element 16 comprises a torsion spring that is under an applied torque when the rotatable clip 14 is in the vertical position. As shown in FIG. 4, the inverted U-shaped pocket 30 prevents twisting of the rotatable clip 14 about the vertical axis and prevents over-rotation of the rotatable clip 14 about a horizontal axis. As shown in FIG. 5, the locking clips 34 prevent counter-rotation of the rotatable clip 14 about the horizontal axis. Consequently, the rotatable clip 14 is secured in the vertical (use) position, despite being tooled and cast in the horizontal position.

Figure 6:
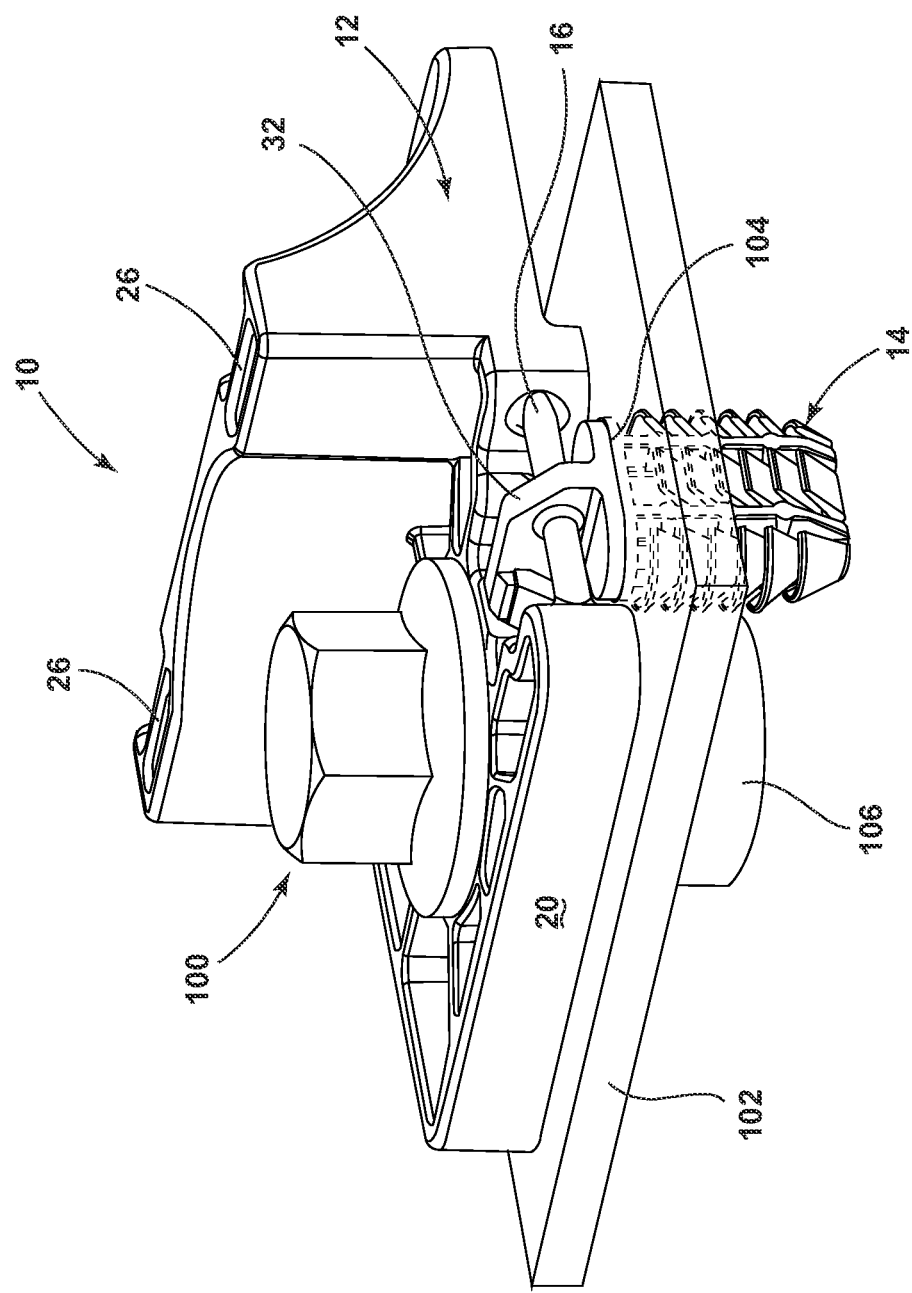
FIG. 6 is a perspective view of the cable routing fastener of FIG. 3 joined to a vehicle panel.

Attachment of the cable routing fastener 10 to a panel is further shown in FIG. 6. In particular, FIG. 6 depicts the cable routing fastener 10 in combination with a bolt 100 for attachment to a panel 102. With the rotatable clip 14 in the vertical position, the cable routing fastener 10 is lowered onto the panel 102. The rotatable clip 14 is press-fit into a first panel aperture 104 until the lowermost extent of the base portion 12 is in abutment with the upper surface of the panel 102. In this position, the central fastener aperture 22 of the base portion 12 is in alignment with a second panel aperture. The bolt 100 is then threadably secured to the panel 102. As shown in FIG. 6, the panel 102 includes an internally threaded boss 106 on an underside thereof. Alternatively, the bolt 100 is threadably secured to a nut on the underside of the panel 102. In each configuration, the rotatable clip 14 retains the cable routing fastener 10 in position until a fastener 100 threadably secures the cable routing fastener 10 to the panel 102. A wiring harness is then positioned onto the concave support surface 24, and cable ties are inserted through the cable tie slots 26. The cable ties extend around the wire harness and enter a ratchet-style lock in a manner known in the art to secure the wire harness to the vehicle panel 102.

As noted above, the cable routing fastener 10 can provide a number of advantages over existing designs. By molding the rotatable clip 14 in a horizontal position, generally co-planar with the body portion 12, the tool complexity and cost for the cable routing fastener 10 is greatly reduced. Once manufactured, the rotatable clip 14 can be manually rotated to the vertical position, extending downward for insertion into a fastener aperture 104. While the rotatable clip 14 is in the vertical position, the torsion element 16 remains under torsion, but in static equilibrium, with the locking clips 34 preventing counter-rotation. The inverted U-shaped pocket 30 prevents both twisting and over-rotation of the rotatable clip 14, thereby ensuring the torsion element 16 does not experience significant bending loads when the rotatable clip 14 is deployed in the vertical position. While described above as a cable routing fastener, the present invention can be implemented as a fastener for other applications, including fasteners for engine panels, headliners, splash shields, and radiator shields, by example.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A fastener assembly comprising:
    a base portion including a peripheral edge, the base portion defining a lateral recess along a portion of the peripheral edge;
    a torsion element integrally joined to the base portion and extending across the lateral recess, the torsion element being adapted to twist in response to an applied torque; and
    a rotatable clip integrally joined to the torsion element, the rotatable clip being rotatable relative to the base portion from a first position to a second position;
    wherein the torsion element includes a first torsion bar on a first side of the rotatable clip and includes a second torsion bar on a second side of the rotatable clip;
    wherein, in the first position, the rotatable clip extends laterally outward from the base portion;
    wherein, the second position, the rotatable clip extends downward from the base portion for insertion into a fastener opening; and
    wherein the base portion includes first and second locking clips extending into the lateral recess to engage first and second locking tabs of the rotatable clip to prevent counter-rotation of the rotatable clip from the second position to the first position.

2. The fastener assembly of claim 1, wherein the base portion includes anti-rotation stop to prevent twisting and over-rotation of the rotatable clip.

3. The fastener assembly of claim 1, wherein the rotatable clip includes a free end and a fixed end, the fixed end being integrally joined to the first torsion bar and the second torsion bar.

4. A fastener assembly comprising:
    a base portion including a peripheral edge, the base portion defining a lateral recess along a portion of the peripheral edge;
    a torsion element integrally joined to the base portion and extending across the lateral recess, the torsion element being adapted to twist in response to an applied torque; and
    a rotatable clip integrally joined to the torsion element, the rotatable clip being rotatable relative to the base portion from a first position to a second position;
    wherein the torsion element includes a first torsion bar on a first side of the rotatable clip and includes a second torsion bar on a second side of the rotatable clip;
    wherein, in the first position, the rotatable clip extends laterally outward from the base portion;
    wherein, the second position, the rotatable clip extends downward from the base portion for insertion into a fastener opening; and
    wherein the rotatable clip includes a shank having a plurality of resilient fins extending at an angle relative to a lengthwise axis of the rotatable clip.

5. A fastener assembly comprising:
    a base portion including a peripheral edge, the base portion defining a lateral recess along a portion of the peripheral edge;
    a torsion element integrally joined to the base portion and extending across the lateral recess, the torsion element being adapted to twist in response to an applied torque; and
    a rotatable clip integrally joined to the torsion element, the rotatable clip being rotatable relative to the base portion from a first position to a second position;
    wherein the torsion element includes a first torsion bar on a first side of the rotatable clip and includes a second torsion bar on a second side of the rotatable clip;
    wherein, in the first position, the rotatable clip extends laterally outward from the base portion;
    wherein, the second position, the rotatable clip extends downward from the base portion for insertion into a fastener opening; and
    wherein the base portion includes a plurality of cable tie slots, the cable tie slots adapted to receive a plurality of cable ties.

6. A fastener assembly comprising:
    a base portion including a peripheral edge, the base portion defining a lateral recess along a portion of the peripheral edge;
    a torsion element integrally joined to the base portion and extending across the lateral recess, the torsion element being adapted to twist in response to an applied torque; and
    a rotatable clip integrally joined to the torsion element, the rotatable clip being rotatable relative to the base portion from a first position to a second position;
    wherein the torsion element includes a first torsion bar on a first side of the rotatable clip and includes a second torsion bar on a second side of the rotatable clip;
    wherein, in the first position, the rotatable clip extends laterally outward from the base portion;
    wherein, the second position, the rotatable clip extends downward from the base portion for insertion into a fastener opening; and
    wherein the base portion includes a central aperture, the central aperture being adapted to receive a bolt or a screw.

7. A fastener assembly comprising:
    a base portion including a peripheral edge, the base portion defining a lateral recess along a portion of the peripheral edge;
    a torsion element integrally joined to the base portion and extending across the lateral recess, the torsion element being adapted to twist in response to an applied torque; and
    a rotatable clip integrally joined to the torsion element, the rotatable clip being rotatable relative to the base portion from a first position to a second position;
    wherein the torsion element includes a first torsion bar on a first side of the rotatable clip and includes a second torsion bar on a second side of the rotatable clip;
    wherein, in the first position, the rotatable clip extends laterally outward from the base portion;
    wherein, the second position, the rotatable clip extends downward from the base portion for insertion into a fastener opening; and
    wherein the base portion further includes a concave support surface on which a cable or cable bundle is supportable.

8. The fastener assembly of claim 1, wherein the rotatable clip moves through an angle of 90° when transitioning from the first position to the second position.

9. The fastener assembly of claim 1, wherein the base portion and the rotatable clip are co-molded from a thermoplastic resin as a unitary article.

10. A cable fastener comprising:
- a base portion including a plurality of cable tie slots, the base portion including an integral torsion element supported on opposing ends thereof; and
- a rotatable clip integrally joined to the torsion element, the rotatable clip including a shank having a plurality of fins, the rotatable clip being rotatable relative to the base portion from a first position to a second position in response to an applied torque;
- wherein the shank extends laterally outward from the base portion in the first position and extends downward from the base portion in the second position;
- wherein the base portion and the rotatable clip are co-molded as a unitary article, such that the rotatable clip can be moved into the second position for attachment to an object.

11. The cable fastener of claim 10, wherein the torsion element includes a first torsion bar on a first side of the shank and includes a second torsion bar on a second side of the shank.

12. The cable fastener of claim 10, wherein the torsion element extends across a lateral recess in a peripheral portion of the base portion.

13. The cable fastener of claim 12, wherein the base portion includes first and second locking clips that extend into the lateral recess and that engage first and second locking tabs of the rotatable clip to prevent counter-rotation of the shank from the second position.

14. The cable fastener of claim 13, wherein the rotatable clip includes a head opposite of the shank, the first and second locking tabs extending from the head of the rotatable clip.

15. The cable fastener of claim 10, wherein the base portion includes anti-rotation stop to prevent over-rotation of the shank beyond the second position.

16. The cable fastener of claim 10, wherein the base portion further includes a central aperture, the central aperture being adapted to receive a bolt or a screw.

17. The cable fastener of claim 10, wherein the base portion further includes a concave support surface on which a cable or cable bundle is supportable.

18. The cable fastener of claim 10, wherein the shank moves through an angle of 90° when transitioning from the first position to the second position.

19. The cable fastener of claim 11, wherein the plurality of fins extend at an acute angle relative to a lengthwise axis of the shank.

* * * * *